US 6,613,468 B2

(12) United States Patent
Simpkins et al.

(10) Patent No.: US 6,613,468 B2
(45) Date of Patent: Sep. 2, 2003

(54) GAS DIFFUSION MAT FOR FUEL CELLS

(75) Inventors: Haskell Simpkins, Grand Blanc, MI (US); William J. LaBarge, Bay City, MI (US); Carl Miller, Millington, MI (US); Blaine R. Danley, Mecosta, MI (US)

(73) Assignee: Delphi Technologies, Inc., Troy, MI (US)

( * ) Notice: Subject to any disclaimer, the term of this patent is extended or adjusted under 35 U.S.C. 154(b) by 217 days.

(21) Appl. No.: 09/747,434

(22) Filed: Dec. 22, 2000

(65) Prior Publication Data

US 2002/0081475 A1 Jun. 27, 2002

Related U.S. Application Data

(60) Provisional application No. 60/239,787, filed on Oct. 12, 2000.

(51) Int. Cl.[7] ................................................ H01M 2/00

(52) U.S. Cl. ......................... 429/34; 429/30; 429/32
(58) Field of Search ............................... 429/30, 32, 34

(56) References Cited

U.S. PATENT DOCUMENTS

| 5,238,754 A | | 8/1993 | Yasuo et al. ................ 429/30 |
| 5,935,727 A | | 8/1999 | Chiao ........................ 429/32 |
| 6,045,935 A | * | 4/2000 | Ketcham et al. ............. 429/30 |
| 6,106,967 A | | 8/2000 | Virkar et al. ................ 429/34 |

* cited by examiner

*Primary Examiner*—Laura Weiner
(74) *Attorney, Agent, or Firm*—Vincent A. Cichosz

(57) ABSTRACT

A solid oxide fuel cell is disclosed. The solid oxide fuel cell comprises an electrolyte disposed between and in ionic communication with a first electrode and a second electrode to form an electrochemical cell. At least one spacer is disposed in contact with the electrochemical cell. A mat is disposed adjacent to the spacer. A method for making a solid oxide fuel cell is also disclosed.

46 Claims, 4 Drawing Sheets

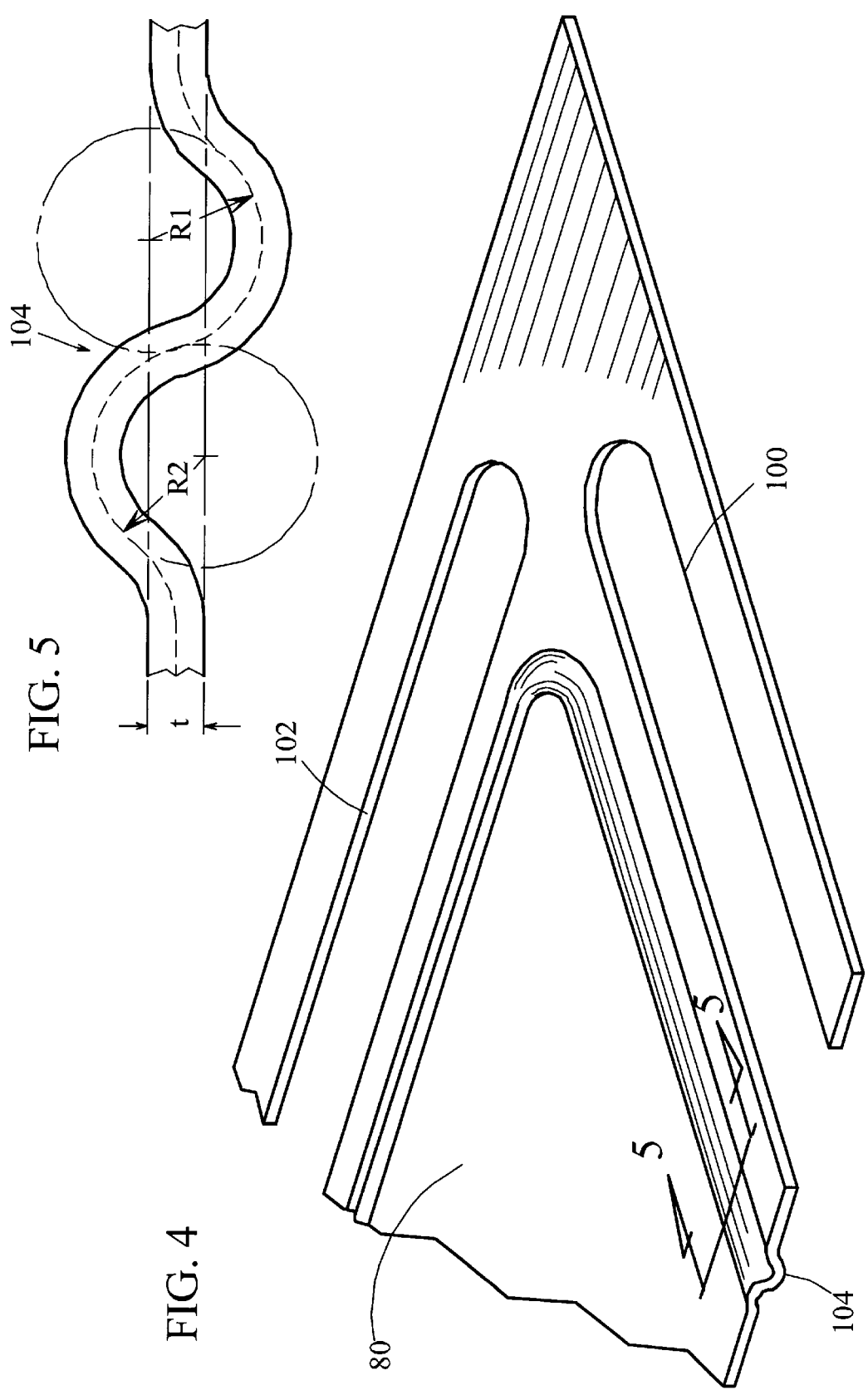

GAS DIFFUSION MAT FOR FUEL CELLS

CROSS REFERENCE TO RELATED APPLICATIONS

This application claims the benefit of the filing date of U.S. Provisional Application Serial No. 60/239,787 filed on Oct. 12, 2000, which is incorporated herein in its entirety.

TECHNICAL FIELD

The present disclosure relates to solid oxide fuel cells, and particularly to a gas diffusion mat for fuel cells.

BACKGROUND

A fuel cell is an energy conversion device that converts chemical energy into electrical energy. The fuel cell generates electricity and heat by electrochemically combining a gaseous fuel, such as hydrogen, carbon monoxide, or a hydrocarbon, and an oxidant, such as air or oxygen, across an ion-conducting electrolyte. The fuel cell generally consists of two electrodes positioned on opposite sides of an electrolyte. The oxidant passes over the oxygen electrode (cathode) while the fuel passes over the fuel electrode (anode), generating electricity, water, and heat.

A solid oxide fuel cell (SOFC) is constructed entirely of solid-state materials, utilizing an ion conductive oxide ceramic as the electrolyte. A conventional electrochemical cell in a SOFC is comprised of an anode and a cathode with an electrolyte disposed therebetween. Typically, the components of an electrochemical cell and a SOFC are rigid and extremely fragile since they are produced from brittle materials.

In a typical SOFC, a fuel flows to the anode where it is oxidized by oxide ions from the electrolyte, producing electrons that are released to the external circuit, and mostly water and carbon dioxide are removed in the fuel flow stream. At the cathode, the oxidant accepts electrons from the external circuit to form oxide ions. The oxide ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

Seals must be provided around the edges of the various cell stack components to inhibit cross-over of fuel and/or oxidant. For example, seals are disposed between the electrodes and adjacent flow fields, around manifolds, between flow fields and cell separators, and elsewhere. One factor in establishing SOFC reliability is the integrity of these seals. Leaks in the manifold seals, electrochemical seals, or other defects can lead to the SOFC failure. When oxygen crosses over to the anode, forming an oxidizing environment, anode oxidation can occur, creating a volume change that results in an increase in internal stress and ultimately in a costly mechanical failure of the electrochemical cell. Thus, many failures can be attributed to the rigidity of the SOFC.

What is needed in the art is a more flexible and, hence, more durable SOFC.

SUMMARY

The drawbacks and disadvantages of the prior art are overcome by the solid oxide fuel cell, solid oxide fuel cell stacks, and interconnect disclosed herein. The interconnect comprises an expander and a flow section disposed between the expander and an interconnect periphery.

In one embodiment, the solid oxide fuel cell comprises an electrolyte disposed between and in ionic communication with a first electrode and a second electrode to form an electrochemical cell. Disposed in physical contact with at least a portion of the electrochemical cell is a mat, with a spacer disposed around the mat.

Another embodiment of the solid oxide fuel cell stack comprises at least two solid oxide fuel cells. Each solid oxide fuel cell comprises an electrolyte disposed between and in ionic communication with a first electrode and a second electrode, forming an electrochemical cell. A mat is disposed adjacent to and in physical contact with at least a portion of the electrochemical cell, with at least one spacer disposed around the mat. On the side of the mat opposite the electrochemical cell is an interconnect.

One method for manufacturing an embodiment of the solid oxide fuel cell stack, comprises disposing an electrolyte between and in ionic communication with a first electrode and a second electrode to form an electrochemical cell. A mat is disposed in physical contact with at least a portion of the electrochemical cell. Around the mat, at least one spacer is disposed. Disposed in electrical communication with the mat, on a side opposite the electrochemical cell, is an interconnect.

In one embodiment, the solid oxide fuel cell stack comprises at least two solid oxide fuel cells. The fuel cells comprise an electrochemical cell formed of an electrolyte disposed between and in ionic communication with a first electrode and a second electrode. Disposed between adjacent fuel cells is an interconnect having at least one flow section disposed between an expander and a periphery.

BRIEF DESCRIPTION OF THE DRAWINGS

Referring now to the figures, which are meant to be exemplary, not limiting, and wherein like elements are numbered alike in the figures.

FIG. 4 is a top view of a portion of an interconnect.

FIG. 5 is a partial cross-sectional view of an interconnect expander.

DESCRIPTION OF THE PREFERRED EMBODIMENT

A SOFC operates at high temperatures (generally from about 800° C. to about 1,200° C.) requiring durable materials that can conduct electrical energy at high temperatures. A gas diffusion mat can provide a SOFC with a surface area that heats up quickly and radiates the thermal energy for use by the SOFC. The gas diffusion mat, spacers and interconnects create a more flexible and durable SOFC. Different types of SOFC systems exist, including tubular and planar systems. These various systems operate with different cell configurations. Therefore, reference to a particular cell configuration and components for use within a particular cell configuration are intended to also represent similar components in other cell configurations where applicable.

Figure 1:
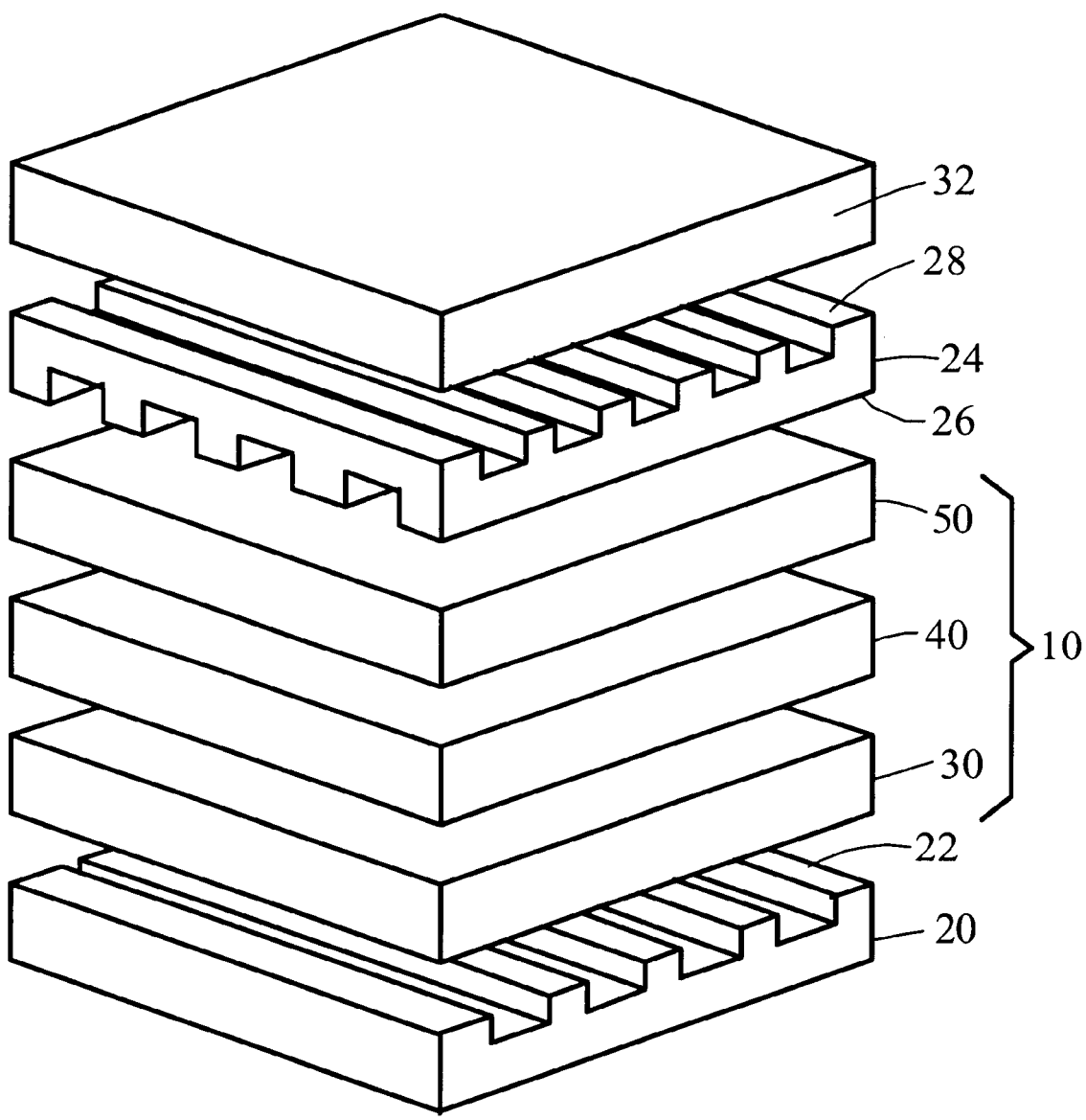
FIG. 1 is a view of a single prior art planar SOFC.

One conventional configuration of a SOFC includes a stack of planar SOFCs. A single conventional SOFC is illustrated in FIG. 1. A fuel electrode (or anode) 30 and an oxygen electrode (or cathode) 50 are disposed on opposite sides of a solid electrolyte 40 to form an electrochemical cell 10. An end cap 20 includes a surface 22 that is configured for disposal adjacent to the anode 30 for both electrical contact and also to provide fuel distribution. An interconnect 24 includes a first interconnect surface 26, and a second interconnect surface 28. Surface 26 is configured for disposal adjacent to the cathode 50 to provide oxidant distribution and electrical contact, and surface 28 is configured for disposal adjacent to an anode 32 of another electrochemical cell. Anode 32 is disposed adjacent to interconnect 24 to illustrate the placement of and ability to stack several electrochemical cells connected to electrochemical cell 10.

Figure 2:
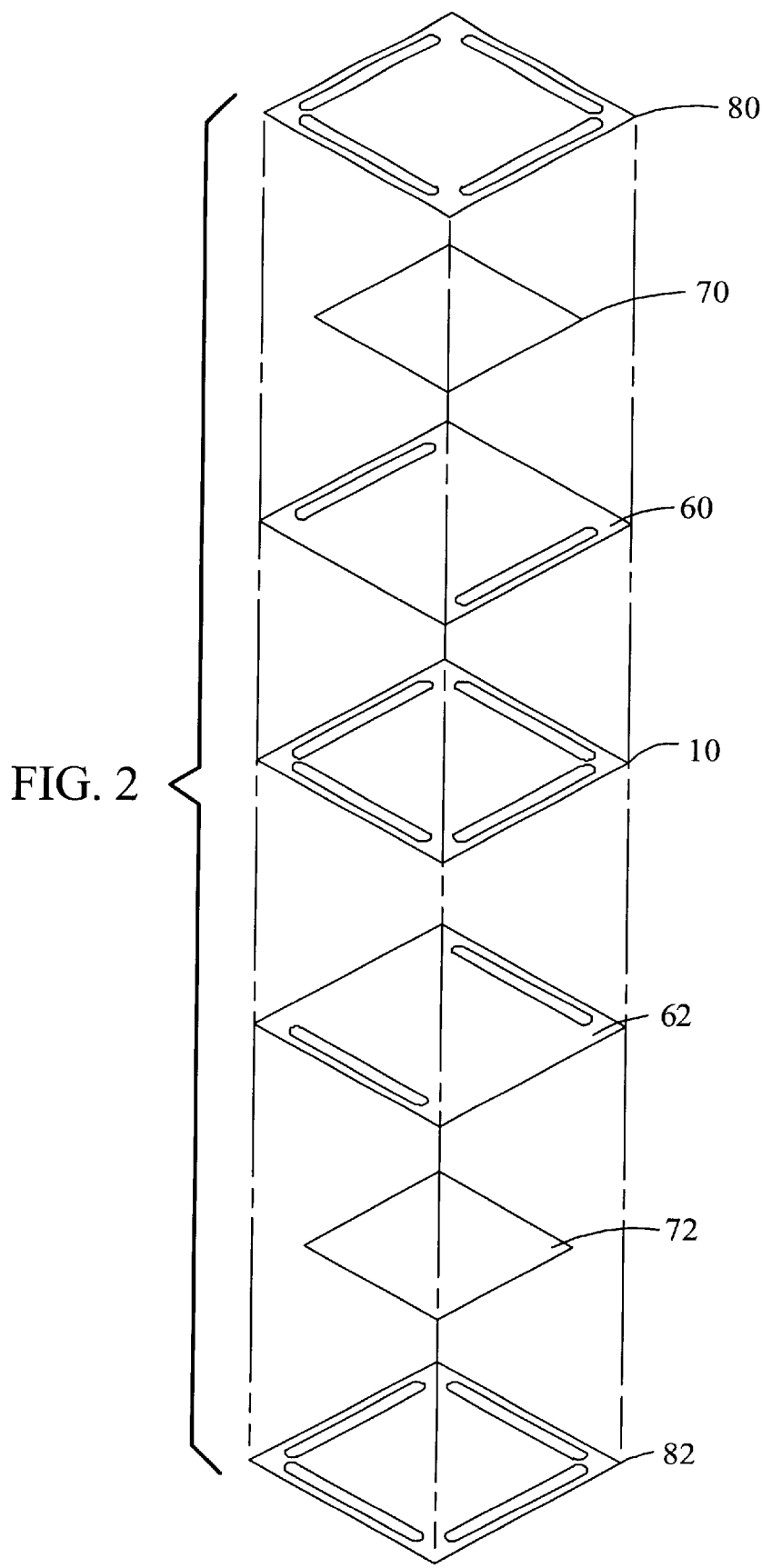
FIG. 2 is a view of a single planar SOFC.

In contrast to FIG. 1, FIG. 2 includes a mat 70, 72. Spacers 60, 62 are disposed on opposite sides of the electrochemical cell 10, essentially forming a frame around the electrodes. Gas diffusion mats 70, 72 are disposed within the spacers 60, 62, respectively, preferably such that the edges of the mats 70, 72 contact, optionally at least partially overlap, with spacers 60, 62, respectively. When stacking more than one SOFC to create a stack, interconnects (or current collectors) 80, 82 can be disposed adjacent to the gas diffusion mats 70,72 to provide electrical communication between the cells.

Referring again to FIG. 1, the electrolyte 40 (e.g., solid oxide electrolyte) of the cell can be an ion conductor, capable of transporting oxide ions from the cathode 50 to the anode 30, that is compatible with the environment in which the SOFC will be utilized (e.g., temperatures of about −40° C. up to about 1,000° C.). Generally, solid electrolyte materials include conventional materials, such as ceramics and/or metals, including zirconium, yttrium, calcium, magnesium, aluminum, rare earths, and the like, as well as oxides, gallates, aluminates, combinations, and composites comprising at least one of the foregoing materials. Preferably the electrolyte is a rare earth oxide (such as gadolinium oxide, neodymium oxide, ytterbium oxide, erbium oxide, ceria, and the like) doped with aliovalent oxide(s) (such as magnesia, calcia, strontia, and the like, and other $^{+2}$ valence metal oxides). The electrolyte can be fabricated by known techniques in the art, including, but not limited to die pressing, roll compaction, stenciling, screen printing, tape casting techniques, and the like. Tape casting is a proven technique for making inexpensive planar structures; the resulting structures exhibit excellent uniformity and reproducibility of dimensions.

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), with a porosity of about 20% to about 40%, typically preferred. The composition of the anode 30 and cathode 50 can comprise materials such as zirconium, yttrium, nickel, manganese, strontium, lanthanum, calcium, titanium, cobalt, iron, and oxides, alloys, and combinations comprising at least one of the foregoing materials. Preferably, the anode material is formed upon a ceramic skeleton, such as yttria-stabilized zirconia and the like, for thermal compatibility. Either or both the anode 30 and the cathode 50 can be formed on the electrolyte 40 by a variety of techniques including sputtering, chemical vapor deposition, screen printing, spraying, dipping, painting, and stenciling, among others. The electrodes are disposed typically up to about 50 to about 1,000 microns or so in thickness. The anode can be disposed with a preferable thickness of about 50 microns to about 1,000 microns, while the cathode can be disposed with preferable thickness of about 50 microns to about 200 microns.

Figure 3:
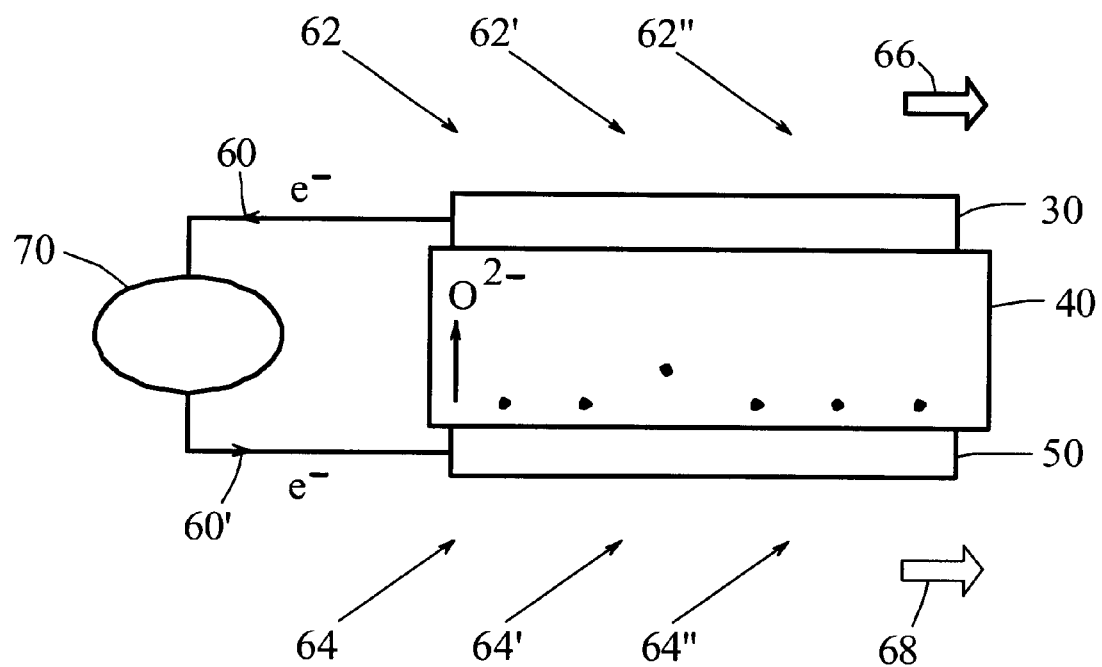
FIG. 3 is a view of a single planar SOFC in operation.

In operation, the electrochemical cell 10 produces a current flow as illustrated by current flow arrows 90, 90' in FIG. 3. Oxidant gases, such as oxygen or air, can be introduced to the cathode side of the cell, flowing as illustrated by the oxidant flow arrows 94, 94', 94''. The oxidant receives the flowing electrons (e$^-$) and converts them into oxide ions (O$^{-2}$), which diffuse through the electrolyte 40 to the anode 30, as depicted in the following reaction:

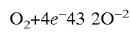

$O_2+4e^-$43 2O$^{-2}$

At the anode, the oxide ions react with a fuel, such as hydrogen, carbon monoxide, methane, or other hydrocarbons, which was introduced to the electrochemical cell 10 as illustrated by the fuel flow arrows 92, 92', 92''. The reaction of the fuel and oxide ions, producing electrons (e$^-$), which flow outside of the electrochemical cell 10 to the external circuit 100 and back to the cathode 50. The fuel/oxide ion reaction is depicted in the following reactions:

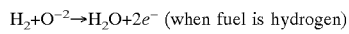

$H_2+O^{-2} \rightarrow H_2O+2e^-$ (when fuel is hydrogen)

$CO+O^{-2} \rightarrow CO_2+2e^-$ (when fuel is carbon monoxide)

$CH_4+4O^{-2} \rightarrow 2H_2O+CO_2+8e^-$ (when fuel is methane)

Unreacted fuel and byproducts, such as water, carbon dioxide, and carbon monoxide, exit the electrochemical cell 10 in the fuel stream, as illustrated by fuel stream arrow 96, while excess oxidant exits the electrochemical cell 10, as illustrated by oxidant stream arrow 98.

Basically, the electrolyte 40 conducts these oxide ions (O$^{-2}$) between the anode 30 and the cathode 50, maintaining an overall electrical charge balance. The cycle of flowing electrons (e$^-$) from the anode 30 through the external circuit 100 to the cathode 50 creates electrical energy for harnessing.

As further illustrated in FIG. 2, an optional spacer 60 is disposed adjacent to the cathode side of the electrochemical cell 10, to create cavities through which oxidant gases can flow. Similarly, an optional spacer 62 is disposed adjacent to the anode side of the electrochemical cell 10, to create cavities through which fuel gases can flow. The spacer 60, 62 can be a flat plate with a center portion removed to allow for the gas diffusion mat 70, 72 to fit within the spacer 60, 62. Specifically, an opening is present in the center of the spacer 60, 62 for receiving the gas diffusion mat 70, 72. The gas diffusion mat 70, 72 is preferably thicker than the spacer 60, 62 and therefore, extends past the spacer 60, 62 to contact the electrochemical cell 10. Disposed through the spacer 60, 62 are flow channels 100, 102 to allow for the passage of oxidant and/or fuel from a manifold to the appropriate mat 70, 72. Generally, spacer materials include conventional materials, such as ceramics and/or metals, including zirconium, yttrium, calcium, magnesium, aluminum, rare earths, and the like, as well as oxides, gallates, aluminates, combinations, and composites comprising at least one of the foregoing materials. Preferably, the spacers comprise a planar structure fabricated by tape casting of yttria stabilized zirconia and sintering prior to stack assembly. The spacers can also be coated with glass, or the like, to reduce the likelihood of oxidation without interfering with the electrical conductivity of the spacers.

Disposed on a side of one or both of the spacers, opposite the electrochemical cell 10, are gas diffusion mats 70, 72.

The gas diffusion mats 70, 72 are preferably electrically conductive materials that provide moderate mechanical pressure against the interconnect and the spacers in order to maintain electrical connectivity (e.g., will preferably carry a load of about 0.5 amperes per square centimeter (amps/cm$^2$) or more, with about 1.0 amp/cm$^2$ or more preferred) throughout the stack over the range of automobile operating conditions (e.g., about −40° C. to about 1,000° C.). Preferably, the gas diffusion mats 70, 72 will have minimal resistance to gas flow (e.g., will preferably have a pressure differential across the mat of about 300 kilopascals (kPa) or less, with about 200 kPa or less preferred, and about 150 kPa or less especially preferred), and will resist formation of non-conductive protective layers at the contact surfaces in the presence of the requisite electrode gases. The porous structure of the mats include, but are not limited to, wire or fiberous materials (e.g., woven, non-woven, knitted, preforms, and the like), foams, and the like. The mesh (or pores) size of the mat material should be such that the area is sufficient to allow for substantially unobstructed fluid flow through the mat. The thickness of the gas diffusion mats 70, 72, which can comprise one or multiple layers, can be about 100 microns to about 1,000 microns, with a thickness of about 200 microns to about 800 microns preferred, and a thickness of about 300 microns to about 500 microns especially preferred. The flexibility of the gas diffusion mats reduce the stress in the rigid members of the cell, thereby making the cell more durable.

The mat material comprises a ceramic material, such as silicon carbide, alumina (e.g., polycrystalline alumina, and the like), and the like, and combinations comprising at least one of the foregoing materials. The ceramic materials can be coated with a non-oxidizing conductive material, such as nickel, platinum, rhodium, palladium, iridium, ruthenium, molybdenum disilicide, and the like, as well as alloys and combinations of at least one of the foregoing materials. The gas diffusion mats 70, 72 may also comprise a metal or metal oxide, with a coating comprising at least one catalyst material, such as zirconium, nickel, platinum, rhodium, palladium, osmium, iridium, ruthenium, aluminum, titanium, chromium, and the like, as well as oxides, alloys, and combinations of at least one of the foregoing materials. For example, the gas diffusion mats 70, 72 can comprise alumina with a platinum coating, wherein the platinum is at least present on the areas of the mat that physically contact the spacers(s), electrode, or interconnect. Preferably, the mat material comprises nickel, aluminide, alumina, silicon carbide, yttria-zirconia, and combinations comprising at least one of the foregoing materials.

Preferably, the gas diffusion mats 70, 72 will avoid creep for at least about 10,000 hours at about 800° C., e.g., creep less than about 5%, with less than about 3% preferred, and about 1% or less especially preferred. Additionally, the mats will preferably have the ability to compress (e.g., up to about 5% compressibility, with about 2% to about 3% preferred) and relax to take force off of the cell for a period of at least about 10,000 hours. Essentially, the mat preferably retains elasticity for at least about 10,000 hours at about 800° C. In addition to elasticity, the mat is also preferably corrosion resistant such that the mat has a weight change of less than about 0.005 g/m$^2$-hr for at least about 10,000 hours, with a weight change of less than about 0.002 g/m$^2$-hr for at least about 10,000 hours more preferred, and a weight change of less than about 0.001 g/m$^2$-hr for at least about 10,000 hours most preferred.

Optionally, the gas diffusion mats 70, 72 can be attached to the interconnects 80, 82 prior to stack assembly by brazing the materials together. Brazing can be completed by applying a braze paste comprising a noble metal, such as platinum, palladium, gold, and the like, to either the mat or the interconnect and placing the components in a furnace (e.g., a hydrogen bright anneal furnace), to form an integrated mat-interconnect.

The interconnects 80, 82 electrically connect adjacent cells in a fuel cell stack. The interconnects 80, 82 are typically, but not limited to, flat plate structures. As illustrated in FIG. 4, the interconnects 80 can have one or more flow sections 100, 102 (commonly referred to as manifolds) that border the edge of the interconnect and are open to the flow of oxidant or fuel. Near the flow sections 100, 102, along the edge, can optionally be one or more thermal buffers, elements, or expanders 104. These expanders 104 can have a geometry capable of allowing for the expansion and contraction of the fuel cell during operation, thereby providing for a more durable and flexible fuel cell. Possible geometries include "S" shaped, sinusoidal, wave-form (e.g., a rounded wave, pointed wave, multi-sided wave, or the like), and the like. Preferably, the normal radius of the each wave (i.e., "$r_1$" and "r2") is up to about four times the thickness "$t_1$" of the interconnect 40, with up to about twice the thickness preferred. (See FIGS. 4 and 5) Furthermore, the radius of each wave can be equivalent or different, with substantially equivalent radii preferred; e.g., $r_1$ and $r_2$ can be 0.4 millimeters (mm) and $t_1$ can be 0.2 mm; or $r_1$ can be 0.35 mm while $r_2$ can be 0.4 mm, and $t_1$ can be 0.2 mm; or $r_1$ could be 0.35 mm while $r_2$ can be 0.45 mm, and $t_1$ can be 0.2 mm.

Although the expander 104 is preferably disposed around the interconnect up to about 360°, and preferably such that the flow sections (e.g., 100, 102) are disposed between the interconnect and the periphery of the interconnect. The specific location, size, and geometry (e.g., the shape, and whether the expander is a single, continuous element or comprises multiple, e.g, intermittent elements) are based upon the effects of thermally induced stress. These parameters, which are preferably chosen to mitigate thermally induced stress, can be readily optimized by an artisan based upon modeling and experimentation. The expander(s) 104 should be disposed across a sufficient portion of the length of the adjacent flow section to provide the desired flexibility. Preferably, the expander 104, which can be intermittent, extends the length of the flow section 100.

The interconnects 80, 82 can be fabricated by tape casting techniques. The thickness of the flat plate structures is about 500 microns or less. The interconnects 80, 82 are preferably stable and electrically conductive at about 800° C. in a dual environment, i.e., an oxidizing atmosphere on one side and a reducing atmosphere on the other side. Some possible interconnects 80, 82 can comprise materials such as silver, copper, ferrous materials, strontium, aluminum, lanthanum, chromium, chrome, gold, platinum, palladium, nickel, titanium, conducting ceramics (e.g., doped rare earth oxides of chromium, manganese, cobalt, nickel, and the like; doped zirconia, including, zirconia doped with titanium, copper, and the like), and the like, as well as alloys, oxides, cermets, composites, and combinations comprising at least one of the foregoing materials. Preferably, the interconnects 80, 82 comprise lanthanum chromite doped with an alkaline earth element. More preferably, the interconnects 80, 82 comprise strontium-doped lanthanum chromite (LSC). Also, metals, such as ferritic stainless steels, nickel, chrome, aluminum alloys, may be coated with LSC or strontium-doped lanthanum manganite (LSM) to achieve the same desired properties.

By utilizing gas diffusion mats, spacers, and interconnects in the fuel cell, flexibility is added to the cell, thereby making the cell more durable. The use of the mats in combination with the spacers allows for air and fuel to flow through the cell while maintaining inhibiting creep for up to and exceeding about 10,000 hours at about 800° C. The addition of the interconnect comprising expanders further enhances creep resistance. This fuel cell is less expensive and more durable than conventional fuel cells.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A solid oxide fuel cell, comprising:
    an electrolyte disposed between and in ionic communication with a first electrode and a second electrode, forming an electrochemical cell;
    a mat disposed adjacent to and in physical contact with at least a portion of said electrochemical cell; and
    a spacer disposed around said mat.

2. The solid oxide fuel cell of claim 1, wherein said mat comprises a porous structure.

3. The solid oxide fuel cell of claim 2, wherein said porous structure is selected from the group consisting of foam, woven fibers, non-woven fibers, knitted fibers, woven wire, non-woven wire, knitted wire, and combinations comprising at least one of the foregoing porous structures.

4. The solid oxide fuel cell of claim 1, wherein said mat comprises a thickness of about 100 microns to about 1,000 microns.

5. The solid oxide fuel cell of claim 4, wherein said mat comprises a thickness of about 200 microns to about 800 microns.

6. The solid oxide fuel cell of claim 5, wherein said mat comprises a thickness of about 300 microns to about 500 microns.

7. The solid oxide fuel cell of claim 1, wherein said mat comprises a material selected from the group consisting of nickel aluminide, alumina, silicon carbide, yttria stabilized zirconia, and combinations comprising at least one of the foregoing materials.

8. The solid oxide fuel cell of claim 1, wherein said mat further comprises a material selected from the group consisting of material from the group consisting of zirconium, nickel, platinum, rhodium, palladium, osmium, iridium, ruthenium, aluminum, titanium, chromium, and oxides, alloys, and combinations of at least one of the foregoing materials.

9. The solid oxide fuel cell of claim 1, wherein said mat will creep less than about 5% after about 10,000 hours at about 800° C.

10. The solid oxide fuel cell of claim 9, wherein said mat will creep less than about 3% after about 10,000 hours at about 800° C.

11. The solid oxide fuel cell of claim 10, wherein said mat will creep about 1% or less after about 10,000 hours at about 800° C.

12. The solid oxide fuel cell of claim 1, wherein said mat has a weight change of less than about 0.005 g/m$^2$-hr for at least about 10,000 hours.

13. The solid oxide fuel cell of claim 1, further comprising an interconnect having an expander, said interconnect disposed in electrical communication with said mat.

14. The solid oxide fuel cell of claim 13, wherein said expander is disposed around said interconnect up to about 360° and adjacent to flow sections.

15. The solid oxide fuel cell of claim 14, wherein said expander has a geometry selected from the group consisting of "S" shaped, sinusoidal, and wave-form.

16. The solid oxide fuel cell of claim 13, wherein said expander has a normal radius of up to about four times a thickness of said interconnect.

17. The solid oxide fuel cell of claim 16, wherein said expander has a normal radius of up to about two times a thickness of said interconnect.

18. The solid oxide fuel cell of claim 13, wherein a normal radius of a first portion of said expander is substantially equal to a normal radius of a second portion of said expander.

19. The solid oxide fuel cell of claim 1, wherein said mat is brazed to said interconnect to form an integral mat-interconnect.

20. The solid oxide fuel cell of claim 1, wherein at least one mat edge overlaps at least a portion of said spacer.

21. A solid oxide fuel cell stack, comprising:
    at least two solid oxide fuel cells, wherein each solid oxide fuel cell comprises an electrolyte disposed between and in ionic communication with a first electrode and a second electrode, forming an electrochemical cell, a mat disposed adjacent to and in physical contact with at least a portion of said electrochemical cell, and at least one spacer disposed around said mat; and
    an interconnect disposed in between adjacent fuel cells and in electrical communication with said mat.

22. The solid oxide fuel cell stack of claim 21, wherein said mat comprises a porous structure selected from the group consisting of foam, woven fibers, non-woven fibers, knitted fibers, woven wire, non-woven wire, knitted wire, and combinations comprising at least one of the foregoing porous structures.

23. The solid oxide fuel cell stack of claim 21, wherein said mat comprises a material selected from the group consisting of nickel aluminide, alumina, silicon carbide, yttria stabilized zirconia, and combinations comprising at least one of the foregoing materials.

24. The solid oxide fuel cell stack of claim 21, wherein said mat further comprises a coating material selected from the group consisting of zirconium, nickel, platinum, rhodium, palladium, osmium, iridium, ruthenium, aluminum, titanium, chromium, and oxides, alloys, and combinations of at least one of the foregoing materials.

25. The solid oxide fuel cell stack of claim 21, wherein said interconnect has an expander.

26. The solid oxide fuel cell stack of claim 25, wherein said expander is disposed around said interconnect up to about 360° and adjacent to flow sections.

27. The solid oxide fuel cell stack of claim 25, wherein said expander has a geometry selected from the group consisting of "S" shaped, sinusoidal, and wave-form.

28. The solid oxide fuel cell stack of claim 25, wherein said expander has a normal radius of up to about four times a thickness of said interconnect.

29. The solid oxide fuel cell stack of claim 28, wherein said expander has a normal radius of up to about two times a thickness of said interconnect.

30. The solid oxide fuel cell of claim 25, wherein a normal radius of a first portion of said expander is substantially equal to a normal radius of a second portion of said expander.

31. The solid oxide fuel cell stack of claim 21, wherein said mat is brazed to said interconnect to form an integral mat-interconnect.

32. A method for manufacturing a solid oxide fuel cell stack, comprising:
   disposing an electrolyte between and in ionic communication with a first electrode and a second electrode to form an electrochemical cell;
   disposing a mat and in physical contact with at least a portion of said electrochemical cell;
   disposing at least one spacer around said mat; and
   disposing an interconnect in electrical communication with said mat on a side opposite said electrochemical cell.

33. The method of claim 32, wherein said mat is selected from the group of materials consisting of foam, woven fibers, non-woven fibers, knitted fibers, woven wire, non-woven wire, knitted wire, and combinations comprising at least one of the foregoing materials.

34. The method of claim 32, wherein said mat comprises a material selected from the group consisting of nickel aluminide, alumina, silicon carbide, yttria stabilized zirconia, and combinations comprising at least one of the foregoing materials.

35. The method of claim 32, wherein said mat further comprises a coating material selected from the group consisting of material from the group consisting of nickel, platinum, rhodium, palladium, osmium, iridium, ruthenium, aluminum, titanium, chromium, and oxides, alloys, and combinations of at least one of the foregoing materials.

36. The method of claim 32, wherein said interconnect further comprises an expander.

37. The method of claim 36, wherein said expander is disposed around said interconnect up to about 360° and adjacent to flow sections.

38. The method of claim 36, wherein said expander has a geometry selected from the group consisting of "S" shaped, sinusoidal, and wave-form.

39. The method of claim 36, wherein said expander has a normal radius of up to about four times a thickness of said interconnect.

40. The method of claim 39, wherein said expander has a normal radius of up to about two times a thickness of said interconnect.

41. The method of claim 32, further comprising brazing said mat to said interconnect to form an integral mat-interconnect.

42. A solid oxide fuel cell stack comprising:
   at least two solid oxide fuel cells, wherein each solid oxide fuel cell comprises an electrolyte disposed between and in ionic communication with a first electrode and a second electrode, forming an electrochemical cell; and
   an interconnect disposed between adjacent fuel cells, wherein said interconnect has at least one flow section disposed between an expander and a periphery, said expander is disposed around said interconnect up to about 360°.

43. The solid oxide fuel cell stack of claim 42, wherein said expander has a geometry selected from the group consisting of "S" shaped, sinusoidal, and waveform.

44. The solid oxide fuel cell stack of claim 42, wherein said expander has a normal radius of up to about four times a thickness of said interconnect.

45. The solid oxide fuel cell stack of claim 42, wherein said expander has a normal radius of up to about two times a thickness of said interconnect.

46. The solid oxide fuel cell of claim 42, wherein a normal radius of a first portion of said expander is substantially equal to a normal radius of a second portion of said expander.

* * * * *